United States Patent [19]

Hobes et al.

[11] 4,246,357
[45] Jan. 20, 1981

[54] COPOLYMERS OF ETHYLENE AND THEIR USE IN THE PREPARATION OF FOAMABLE PLASTICS

[75] Inventors: John V. Hobes, Dinslaken; Wolfgang Payer, Wesel, both of Fed. Rep. of Germany

[73] Assignee: Ruhrchemie Aktiengesellschaft, Oberhausen, Fed. Rep. of Germany

[21] Appl. No.: 55,880

[22] Filed: Jul. 9, 1979

[30] Foreign Application Priority Data

Jul. 10, 1978 [DE] Fed. Rep. of Germany ....... 2830328

[51] Int. Cl.³ .................................................. C08J 9/02
[52] U.S. Cl. ..................................... 521/77; 521/98; 521/141; 521/149; 525/62
[58] Field of Search ............... 525/62; 521/77, 141

[56] References Cited

U.S. PATENT DOCUMENTS

| | | | |
|---|---|---|---|
| 3,044,970 | 7/1962 | Baumeister et al. | 521/77 |
| 3,760,047 | 9/1973 | Gaeth et al. | 521/77 |
| 4,027,079 | 5/1977 | McClain et al. | 525/62 |
| 4,119,687 | 10/1978 | Resz et al. | 525/62 |
| 4,135,026 | 1/1979 | Hoyt et al. | 525/62 |
| 4,151,134 | 4/1979 | McClain | 525/62 |
| 4,155,893 | 5/1979 | Fujimoto et al. | 525/62 |

*Primary Examiner*—Morton Foelak
*Attorney, Agent, or Firm*—Sprung, Felfe, Horn, Lynch & Kramer

[57] ABSTRACT

A foamable copolymer comprising 40 to 98 percent by weight units of ethylene, 1 to 30 weight percent units of vinyl alcohol, 1 to 30 weight percent units of acrylic acid ester of a secondary or tertiary alcohol, and up to 2 percent by weight of vinyl acetate units is described together with a process for the manufacture thereof. The same is useful in the formation of a foamed mass which is relatively highly cross-linked. The copolymer can be foamed to form a foam by heating the same at 250° to 350° C. for 5 to 60 minutes in the absence of oxygen.

10 Claims, No Drawings

COPOLYMERS OF ETHYLENE AND THEIR USE IN THE PREPARATION OF FOAMABLE PLASTICS

BACKGROUND OF THE INVENTION

1. Field of the Invention

The present invention relates to copolymers of ethylene which are suitable for forming foams.

2. Discussion of the Prior Art

Foamed plastics are used in many fields of industry. They are especially used as packaging material and for heat and sound insulation. Various thermoplastic materials are suitable for preparing them. Examples include polyurethanes, polystyrene, polyethylene, rigid and plasticized polyvinyl chloride. In a known process, a chemical blowing agent which is decomposed in the melt of the thermoplastic materials is used. During the heat treatment, there is an evolution of gas which causes foaming of the composition and formation of pores in the plastic. According to another known process, an inert gas is dissolved in the plastic material under a very high pressure. Thereafter the pressure is released, and a foam is formed by expansion of the gas.

These so-called blowing agent processes have the disadvantage that foaming must generally be effected in two steps. The first step is operated with closed molds placed in presses, and the second stage involves post-foaming under atmospheric pressure and at a temperature lying slightly above the softening point.

Japanese Patent Application No. 71/36 474 (Chemical Abstracts, Vol. 77, 1972, Abstract No. 89 428 f) describes the preparation of foams from thermoplastics without the addition of blowing agents. In this process, the starting materials are copolymers which on heating cause foaming by cleavage of gaseous decomposition products. Copolymers of ethylene with a comonomer such as vinyl acetate, vinyl butyrate, methyl acrylate or methacrylic acid are used as plastics which are heated in the absence of oxygen, i.e., under reduced pressure or in an inert gas atmosphere to temperatures at which cleavage of the polymer chains does not yet occur.

This process has the disadvantage that foams are obtained which are only slightly cross-linked, the pore structure of which is only slightly evident and can hardly be influenced by variation of the composition of the starting materials and the preparation of which requires reaction times of about 2 hours.

Therefore, the problem had to be solved of providing thermoplastics for the preparation of foams which, on foaming, avoid the deficiencies of the prior art processes and permit the preparation of the foam in commercially feasible and simple means.

SUMMARY OF THE INVENTION

It is an object of the invention to provide foamable copolymers which consist of 40 to 98 percent by weight of ethylene units, 1 to 30 percent by weight of vinyl alcohol units, 1 to 30 percent by weight of acrylic acid ester units of secondary or tertiary alcohols and up to 2 percent by weight of vinyl acetate units.

It is an essential characteristic of the copolymers according to the invention that they contain vinyl alcohol as the monomer component.

To prepare these polymers, one starts from ethylene, vinyl esters and acrylic acid esters which are reacted in known manner at pressures of 400 to 4,000 bars and preferably 1,500 to 2,500 bars and temperatures of 110° to 350° C. and preferably 220° to 290° C. in autoclaves or tubular reactors. In order to obtain polymers having the approximate composition 15 to 96.8 percent by weight of ethylene, 1.2 to 45 percent by weight of vinyl ester and 2 to 40 percent by weight of acrylic acid ester from which the polymers according to the invention are prepared, the mixture of monomers must have approximately the following composition because of the different polymerization rates of the monomers: 40 to 98 percent by weight of ethylene, 1.5 to 50 percent by weight of vinyl esters, and 0.5 to 10 percent by weight of acrylic acid ester. Particularly contemplated vinyl esters include: vinyl propionate, vinyl butyrate. Preferred acrylic acid esters are derived from sec. butanol, tert. butanol, sec. pentanol, and tert. pentanol.

The polymerization is carried out in the presence of catalytic amounts of free radical initiators such as oxygen in amounts of 2 to 250 moles/ppm, based on ethylene to be polymerized. Suitable initiators other than oxygen include peroxides such as tert-butyl perbenzoate, dilauroyl peroxide, di-tert-butyl peroxide or azobutyric acid dinitrile in amounts of 200 moles/ppm, based on ethylene. The polymerization is advantageously carried out in the presence of moderators such as aliphatic alcohols and carbonyl compounds, saturated and unsaturated hydrocarbons or chlorinated hydrocarbons and hydrogen.

For the conversion into the copolymer which contains vinyl alcohol, the copolymer consisting of ethylene, vinyl ester and acrylic acid ester is saponified. This is accomplished by reacting the polymer with an alcoholic solution of an alkali metal hydroxide. The alkali metal hydroxide is used in an amount of 1 to 5 percent by weight, based on polymer charged. The alcohol is a $C_1$ to $C_4$ alcohol, especially methanol, ethanol and propanol. The alkali metal hydroxide is present therein in an amount of 1 to 10 weight percent. The reaction is carried out at temperatures of 60° to 120° C., and preferably 80° to 100° C. The reaction time is 100 to 250, and preferably 120 to 180, minutes. When maintaining the reaction conditions mentioned above, the acrylic acid ester remains unchanged.

According to the invention, the copolymers which consist of ethylene, vinyl alcohol and acrylic acid ester and still contain small amounts, i.e., up to 2 percent by weight, of unchanged vinyl acetate can be foamed by heating them for 5 to 60 minutes at temperatures of 250° to 350° C. The duration of the treating time is dependent on the selected temperature, higher temperatures requiring shorter heating times than lower temperatures. On the other hand, the time of heating is independent of the composition of the copolymer by monomers.

The thermal treatment can be effected within or outside a mold depending upon the intended use of the copolymer. To ensure that the thermoplastic is not chemically influenced by oxidation processes, care should be taken that foaming is effected with exclusion of oxygen. To this end, heating is effected either in a closed mold or with addition of an inert gas.

Heating causes the acrylic acid ester contained in the polymer to be thermally cleaved to acrylic acid and olefin which acts as blowing agent. It is possible by variation of the acrylic acid ester content in the copolymer to influence the pore structure of the foam and, consequently, its density. The higher the acrylic acid ester concentration in the polymer, the lower its density.

The shape and size of the pores can further be controlled in known manner by admixing with the copolymer so-called nucleating agents such as finely powdered silicates, zinc oxide or chalk.

Particularly suitable for the preparation of foams are acrylic acid esters of tertiary alcohols having 4 to 8 carbon atoms such as tert-butyl alcohol. Esters of secondary alcohols may also be used with the same success. However, these require higher cleavage temperatures than the esters of tertiary alcohols. Ester groups which are particularly contemplated are those derived from the following alcohols:

The foams according to the invention are cross-linked because cross links are formed between the polymer chains on foaming. Therefore, they are insoluble in ordinary solvents and are distinguished by high thermal stability and toughness properties.

The portion of vinyl alcohol units in the terpolymer is decisive for the degree of cross linking of the foam. The degree of cross linking increases as the content of vinyl alcohol units in the macromolecule increases.

The foams may be used in known manner as packaging material and for heat and sound insulation. Moreover, they are outstandingly suited as thermoplastic adhesives for various substrates, e.g., for bonding metal to metal or to other materials such as glass, ceramics and plastics.

In the examples which follow, the preparation of the copolymers according to the invention and of foams from the copolymers and the test and measuring methods used to characterize them are described in greater detail.

EXAMPLES

Example 1

In this example and in Examples 2 to 4, the ethylene/vinyl acetate/acrylic acid ester copolymer is prepared as follows:

The starting materials are polymerized in the mixture which is suitable for the preparation of a copolymer having a specific composition, the polymerization being carried out with addition of atmospheric oxygen as initiator and propane as controlling agent in an autoclave at 250° C. and under a pressure of 220 bars.

The saponification of the copolymers containing vinyl acetate to form the corresponding copolymers containing vinyl alcohol is also carried out in Examples 1 to 4 in the same manner by reacting the polymer with an 8 percent alcoholic NaOH solution at about 90° C. (reflux) in a reaction vessel with stirring. The reaction is completed after 120 minutes.

In the present Example 1, a mixture of
87.7 percent by weight of ethylene,
8.5 percent by weight of vinyl acetate, and
3.8 percent by weight of tert-butyl acrylate
is polymerized to form a copolymer composed of
76 percent by weight of ethylene,
7.2 percent by weight of vinyl acetate, and
16.8 percent by weight of tert-butyl acrylate.
This copolymer is then saponified. This results in a product which consists of
78.7 percent by weight of ethylene units,
4.0 percent by weight of vinyl alcohol units,
16.8 percent by weight of tert-butyl acrylate units, and
0.5 percent by weight of vinyl acetate units and has a melt index whose $i_2$ value (g./10 min.) is 160. The polymer has an RSV value (reduced specific viscosity) of 0.57.

The ethylene/vinyl alcohol/tert-butyl acrylate copolymer which still contains small amounts of vinyl acetate is subjected to a thermal treatment at 300° C. for 30 minutes in an inert gas atmosphere. The tert-butyl acrylate units are decomposed thereby with cleavage of iso-butylene. At the same time, the hydroxyl and carboxyl groups react intermolecularly with formation of cross-linked products which are foamed by the isobutylene.

The $i_2$ value of the product of the thermal treatment is no longer determinable.

The foam product is characterized by excellent adhesive properties and high toughness.

|  | Impact tensile strength (mJ/mm.$^2$) | Peel adhesion (N/mm.) |
|---|---|---|
| Starting product | 900 | 0.9 |
| Foamed final product | 1500 | 2.4 |

Example 2

By polymerization of a mixture of
85.6 percent by weight of ethylene,
12.1 percent by weight of vinyl acetate, and
2.3 percent by weight of tert-butyl acrylate,
a copolymer composed of
79.0 percent by weight of ethylene,
10.5 percent by weight of vinyl acetate, and
10.5 percent by weight of tert-butyl acrylate
is prepared and then saponified. A product consisting of
83.1 percent by weight of ethylene units,
5.8 percent by weight of vinyl alcohol units,
10.5 percent by weight of tert-butyl acrylate units, and
0.6 percent by weight of vinyl acetate units
and having an $i_2$ value of 100 (g./10 min.) and an RSV value of 0.70 is obtained.

The copolymer which contains ethylene, vinyl alcohol, tert-butyl acrylate and small amounts of vinyl acetate is thermally treated at 280° C. in an inert gas atmosphere for 60 minutes.

A foamed, cross-linked product, the $i_2$ value of which is no longer determinable is obtained.

The foam is distinguished by excellent adhesive properties and high toughness. Its properties are compared in the following table with the properties of the starting product (i.e., the non-foamed polymer).

|  | Impact tensile strength (mJ/mm.$^2$) | Peel adhesion (N/mm.) |
|---|---|---|
| Starting product | 800 | 0.8 |
| Foamed final product | 1400 | 2.1 |

Example 2a (Comparative Example)

By polymerization of a mixture of
88.6 percent by weight of ethylene and
11.4 percent by weight of vinyl acetate,
a copolymer consisting of
91.1 percent by weight of ethylene and
9.0 percent by weight of vinyl acetate and having a melt flow index value (190/2.16) of 0.6 g./10 min. is prepared.

After having been heated to 300° C. for 30 minutes under an inert gas atmosphere, the polymer does not show an alteration. Slight foaming is observed as late as after heating for a total of 120 minutes.

While the $i_2$ value of the thermally treated material is reduced to 0.2 g./10 min., only 1 percent of the polymer is cross-linked. The adhesive properties measured by the peel adhesion which is 0.6 N/mm.² are unchanged as compared with those of the starting material.

Example 3

By polymerization of a mixture of
95.8 percent by weight of ethylene,
3.6 percent by weight of vinyl acetate, and
0.6 percent by weight of tert-butyl acrylate,
a copolymer composed of
95.2 percent by weight of ethylene,
2.1 percent by weight of vinyl acetate, and
2.7 percent by weight of tert-butyl acrylate
is prepared and then saponified. This results in a product which consists of
95.9 percent by weight of ethylene units,
1.2 percent by weight of vinyl alcohol units,
2.7 percent by weight of tert-butyl acrylate units, and
0.2 percent by weight of vinyl acetate units
and has an $i_2$ value of 2.5 (g./10 min.) and an RSV value of 1.05.

The copolymer which contains ethylene, vinyl alcohol, t-butyl acrylate and small amounts of vinyl acetate is thermally treated at 280° C. in an inert gas atmosphere for 60 minutes. This results in a foamed cross-linked product, the $i_2$ value of which is no longer determinable.

The foam is characterized by excellent adhesive properties and high toughness. Its properties are compared in the following table with the properties of the starting product (i.e., the non-foamed polymer).

|  | Impact tensile strength (mJ/mm.²) | Peel adhesion (N/mm.) |
| --- | --- | --- |
| Starting product | 550 | 0.2 |
| Foamed final product | 1225 | 1.4 |

Example 4

By polymerization of a mixture of
65.9 percent by weight of ethylene,
29.1 percent by weight of vinyl acetate, and
5.0 percent by weight of tert-butyl acrylate,
a copolymer composed of
52.5 percent by weight of ethylene,
25.2 percent by weight of vinyl acetate, and
22.3 percent by weight of tert-butyl acrylate
is prepared and thereafter saponified. This results in a product which consists of
61.8 percent by weight of ethylene units,
14.8 percent by weight of vinyl alcohol units,
22.3 percent by weight of tert-butyl acrylate units, and
1.1 percent by weight of vinyl acetate units
and has an $i_2$ value of 500 and an RSV value of 0.39.

The copolymer which contains ethylene, vinyl alcohol, t-butyl acrylate and small amounts of vinyl acetate is thermally treated at 300° C. in an inert gas atmosphere for 30 minutes.

There is obtained a highly foamed cross-linked product, the $i_2$ value of which can no longer be determined.

The foam is characterized by excellent adhesive properties and high toughness. Its properties are compared in the following table with the properties of the starting product (i.e., the non-foamed polymer).

|  | Impact tensile strength (mJ/mm.²) | Peel adhesion (N/mm.) |
| --- | --- | --- |
| Starting product | 950 | 1.0 |
| Foamed final product | 2300 | 3.2 |

Test and measuring methods (1) Peel adhesion

Peel adhesion is determined with a Zwick tensile testing machine (vertical type), in the grips of which the tabs (30×100 mm.²) of an assembly of steel sheet-foam-steel sheet are clamped, the tabs extending at an angle of 90° with respect to the specimen. The actual joint area (70×100 mm.²) extends vertically with respect to the grips. The separation speed of the grips is 50 mm./minute. The occurring tensile or peeling forces are recorded by means of a recorder.

(2) Impact tensile strength (DIN 53 448)

The test specimen used is a plate of 1 mm. thickness against which an impact pendulum strikes. The expended impact energy (mJ/mm.²) in a standard climate of 23° C. and 50 percent relative humidity is measured.

(3) Measurement of melt index ($i_2$ value; DIN 53 735)

The measurements are carried out with a testing apparatus "Z 465" of Zwick and Co. at temperatures of 190° C. and a load of 2.16 kgs. The quantity in grams extruded through an orifice of 2.095 mm. diameter and 8 mm. length is based on an extrusion time of 10 minutes.

(4) Measurement of the reduced "specific" viscosity (RSV value)

The reduced viscosity is defined as the quotient of the specific viscosity and concentration of the solution. The determination is effected on solutions of the sample material in DECALIN (0.025 g./100 ml solvent) by means of an Ubbelohde capillary viscosimeter. Dissolution of the sample material in DECALIN and the measurement of the viscosity are effected at 100° C.±0.2° C.

What is claimed is:

1. A foamable copolymer comprising 40 to 98 percent by weight of ethylene units, 1 to 30 percent by weight of vinyl alcohol units, 1 to 30 percent by weight of acrylic acid ester units of secondary or tertiary alcohols and up to 2 percent by weight of vinyl acetate units.

2. A foamable copolymer according to claim 1, wherein the acrylic acid ester units are units of a tertiary alcohol having 4 to 8 carbon atoms.

3. A process for foaming a copolymer according to claim 1 which comprises heating said copolymer for 5 to 60 minutes at 250° to 350° C. in the absence of oxygen.

4. A process for preparing a copolymer according to claim 1 which comprises saponifying a copolymer having 40 to 98 weight percent units of ethylene, 1.5 to 50 weight percent units of a vinyl ester and 0.5 to 10 weight percent units of an acrylic acid ester with an alcoholic solution of an alkali metal hydroxide.

5. A foamed cross-linked copolymer of a saponified copolymer of ethylene, vinyl alcohol and an acrylic acid ester of a secondary or tertiary alcohol which saponified copolymer contains vinyl acetate in an amount of up to 2 percent by weight based upon the combined amount of the weight of the units of ethylene, vinyl alcohol and acrylic acid ester, said saponified copolymer comprising 40 to 90 percent by weight ethylene units, 1 to 30 percent by weight vinyl alcohol units and 1 to 30 percent by weight acrylic acid ester units.

6. A foamed cross-linked copolymer according to claim 5 wherein said acrylic acid ester units are ester units of a tertiary alcohol having 4 to 8 carbon atoms.

7. A foamed cross-linked copolymer according to claim 5 wherein said acrylic acid ester units are acrylic acid ester units of an alcohol selected from the group consisting of secondary butanol, tertiary butanol, secondary pentanol and tertiary pentanol.

8. A polymer according to claim 5 wherein said polymer prior to saponification comprises 15 to 96.8 percent by weight ethylene units, 1.2 to 45 percent by weight of vinyl ester units and 2 to 40 percent by weight of acrylic acid ester units derived from secondary or tertiary alcohols.

9. A process for preparing a copolymer according to claim 5 which comprises:
   (A) forming a terpolymer of ethylene, vinyl acetate and an acrylic acid ester of a secondary or tertiary alcohol so that such polymer comprises 15 to 96.8 percent by weight ethylene units, 1.2 to 45 percent by weight vinyl acetate units and 2 to 40 percent by weight of acrylic acid ester units;
   (B) saponifying the polymer of step A so that it still contains vinyl acetate units, the vinyl acetate units being present in the polymer in an amount of up to 2 percent by weight; and
   (C) subjecting said saponified copolymer to sufficient heat to effect thermal cleavage of said acrylic acid ester and olefin whereby said saponified copolymer is foamed and cross-linked.

10. A process according to claim 9 wherein:
   (1) the polymer of step A is formed by forming a polymerization reaction mixture comprising 40 to 98 percent by weight of ethylene, 1.5 to 50 percent by weight of a vinyl ester and 0.5 to 10 percent by weight of an acrylic acid ester of a secondary or tertiary alcohol and said polymerization reaction mixture is subjected to a pressure of 400 to 4,000 bars at a temperature of 110° to 350° C. for sufficient time to form a polymer comprising 15 to 96.8 percent by weight ethylene, 1.2 to 48 percent by weight of vinyl acetate units and 2 to 40 percent by weight of acrylic acid ester units:
   (2) the polymer obtained from step 1 is saponified by contacting the same with an alcoholic solution of an alkali metal hydroxide, the alcohol being a $C_1$ to $C_4$ alcohol and the alkali metal hydroxide being present in an amount of 1 to 10 weight percent at a temperature of 60° to 120° C. for 120 to 180 minutes; and
   (3) the product obtained from step 2 is heated for 5 to 60 minutes at a temperature of 250° to 350° C. sufficient to effect thermal cleavage of the acrylic acid ester and formation of a cross-linked foamed copolymer.

* * * * *